(12) United States Patent
Bolotnikoff et al.

(10) Patent No.: US 9,110,765 B2
(45) Date of Patent: Aug. 18, 2015

(54) DISPLAYING DIFFERENT HIERARCHY LEVELS OF COMPUTER PROGRAM SOURCE CODE

(71) Applicants: David Lotan Bolotnikoff, Tzur Moshe (IL); Ariel Bentolila, Herzelia (IL)

(72) Inventors: David Lotan Bolotnikoff, Tzur Moshe (IL); Ariel Bentolila, Herzelia (IL)

(73) Assignee: SAP Portals Israel Ltd, Ra'anana (IL)

( * ) Notice: Subject to any disclaimer, the term of this patent is extended or adjusted under 35 U.S.C. 154(b) by 111 days.

(21) Appl. No.: 13/654,198

(22) Filed: Oct. 17, 2012

(65) Prior Publication Data

US 2014/0109043 A1    Apr. 17, 2014

(51) Int. Cl.
*G06F 9/44* (2006.01)
*G06F 3/0484* (2013.01)
*G06F 17/30* (2006.01)

(52) U.S. Cl.
CPC ............ *G06F 8/71* (2013.01); *G06F 17/30914*
(2013.01); *G06F 3/04847* (2013.01); *G06F 8/20* (2013.01); *G06F 8/33* (2013.01); *G06F 8/34* (2013.01)

(58) Field of Classification Search
None
See application file for complete search history.

(56) References Cited

U.S. PATENT DOCUMENTS

| | | | |
|---|---|---|---|
| 7,071,934 B1 * | 7/2006 | Faoro et al. ................... 715/229 |
| 7,526,754 B2 | 4/2009 | Bentolila | |
| 7,681,202 B2 | 3/2010 | Pik et al. | |
| 7,716,640 B2 | 5/2010 | Pik et al. | |
| 8,363,068 B1 * | 1/2013 | Miller et al. .................. 345/660 |
| 8,522,196 B1 * | 8/2013 | Kim et al. ..................... 717/105 |
| 8,561,015 B2 * | 10/2013 | Rowan et al. ................. 717/105 |
| 2002/0184611 A1 * | 12/2002 | Endejan ........................ 717/113 |
| 2003/0132944 A1 * | 7/2003 | Smith ........................... 345/581 |
| 2004/0122791 A1 * | 6/2004 | Sea et al. ........................... 707/1 |
| 2005/0262480 A1 | 11/2005 | Pik et al. | |
| 2006/0041890 A1 | 2/2006 | Pik et al. | |
| 2006/0074735 A1 * | 4/2006 | Shukla et al. ..................... 705/8 |
| 2006/0195823 A1 | 8/2006 | Bentolila | |
| 2006/0230234 A1 | 10/2006 | Bentolila et al. | |
| 2010/0077375 A1 * | 3/2010 | Millmore ...................... 717/101 |
| 2010/0318959 A1 * | 12/2010 | Rowan et al. ................. 717/105 |
| 2011/0016460 A1 * | 1/2011 | Archambault et al. ....... 717/158 |

(Continued)

OTHER PUBLICATIONS

Deline, R., et al., Code Canvas: Zooming towards Better Development Environments, Proceedings of the 32nd ACM/IEEE International Conference on Software Engineering—vol. 2, 2010, pp. 207-210, [retrieved on Mar. 26, 2014], Retrieved from the Internet: <URL:http://dl.acm.org/>.*

(Continued)

*Primary Examiner* — Thuy Dao
*Assistant Examiner* — Geoffrey St Leger
(74) *Attorney, Agent, or Firm* — Fish & Richardson P.C.

(57) ABSTRACT

The present disclosure describes methods, systems, and computer program products for displaying different hierarchy levels of computer program source code. One computer-implemented method includes generating, at a first hierarchy level of a plurality of hierarchy levels, a first code viewer box (CVB) in a software development environment, wherein the first CVB includes source code scaled according to the first hierarchy level, receiving a selection of a zoom level from a graphical controller, wherein the selected zoom level corresponds to a second hierarchy level, scaling, by operation of a computer, the source code according to the second hierarchy level to created newly scaled source code, and generating, based on the received selection, a second CVB at the second hierarchy level including the newly scaled source code.

18 Claims, 10 Drawing Sheets

(56) References Cited

U.S. PATENT DOCUMENTS

2013/0031501 A1* 1/2013 Kodosky et al. .............. 715/771
2014/0289651 A1* 9/2014 Jude et al. .................... 715/762

OTHER PUBLICATIONS

Stengel, M., et al., View Infinity: A Zoomable Interface for Feature-Oriented Software Development, Proceedings of the 33rd International Conference on Software Engineering, 2011, pp. 1031-1033, [retrieved on Dec. 9, 2014], Retrieved from the Internet: <URL:http://dl.acm.org/>.*

Jakobsen, M. R., et al., Fisheye Interfaces—Research Problems and Practical Challenges, Lecture Notes in Computer Science, vol. 6431, 2011, pp. 76-91, [retrieved on Dec. 9, 2014], Retrieved from the Internet: <URL:http://link.springer.com/chapter/10.1007%2F978-3-642-19641-6_6#>.*

Storey, M, et al., On integrating visualization techniques for effective software exploration, Proceedings of IEEE Symposium on Information Visualization, 1997, pp. 38-45, [retrieved on Dec. 10, 2014], Retrieved from the Internet: <URL:http://ieeexplore.ieee.org/>.*

\* cited by examiner

FIG. 2

| ZOOM LEVEL | ZOOM LEVEL DESCRIPTION | DATA LOCATION |
|---|---|---|
| TOP LEVEL | GENERAL APPLICATION DESCRIPTION FILE | LOOK UNDER ROOT DIRECTORY |
| | ERD FILE | LOOK UNDER ROOT DIRECTORY |
| | OBJECT DESCRIPTION FILE | ANALYZE BASED ON ZOOMED AREA WHICH DIRECTORY TO SELECT |
| | OBJECT UI FILE | ANALYZE BASED ON ZOOMED AREA WHICH DIRECTORY TO SELECT |
| | OBJECT PROPERTIES AND METHOD NAMES | ANALYZE BASED ON ZOOMED AREA WHICH DIRECTORY TO SELECT. OPEN CODE FILE |
| | OBJECT PROPERTIES, METHOD NAMES, METHOD PARAMETERS, METHOD RETURN TYPES AND METHOD MODIFIERS | ANALYZE BASED ON ZOOMED AREA WHICH DIRECTORY TO SELECT. OPEN CODE FILE |
| | OBJECT PROPERTIES, METHOD NAMES, METHOD PARAMETERS, METHOD RETURN TYPES, METHOD MODIFIERS AND METHOD BODY | ANALYZE BASED ON ZOOMED AREA WHICH DIRECTORY TO SELECT. OPEN CODE FILE |
| BOTTOM LEVEL | OBJECT PROPERTIES, METHOD NAMES, METHOD PARAMETERS, METHOD RETURN TYPES, METHOD MODIFIERS, METHOD BODY AND EXTERNAL CODE (i.e. STORE PROCEDURES) | ANALYZE BASED ON ZOOMED AREA WHICH DIRECTORY TO SELECT. OPEN CODE FILE |

DISPLAYING DIFFERENT HIERARCHY LEVELS OF COMPUTER PROGRAM SOURCE CODE

BACKGROUND

In contrast to a standard text editor, an application code editor is a computer program designed specifically for editing computer program source code, that is source code, during software development. The application code editor may be a standalone application or built into an integrated development environment (IDE). Application code editors have features specifically designed to simplify and accelerate input of source code, such as syntax highlighting, autocomplete, and source code bracket matching functionality. The editors also often provide a convenient way to execute a compiler, interpreter, debugger, or other computer program involved in the software development process. However, all available source code is displayed in the editor at a single granularity, or hierarchy level, and cannot be varied according to a desired hierarchy level, or zoom level. This inability to view different hierarchy levels of source code results in an unnecessarily cluttered software development environment and may lead to a higher incidence of introduced source code errors during the software development process.

SUMMARY

The present disclosure relates to methods, systems, and computer-readable media for displaying different computer program source code hierarchy levels within application code editors. One computer-implemented method includes generating, at a first hierarchy level of a plurality of hierarchy levels, a first code viewer box (CVB) in a software development environment, wherein the first CVB includes source code scaled according to the first hierarchy level, receiving a selection of a zoom level from a graphical controller, wherein the selected zoom level corresponds to a second hierarchy level, scaling, by operation of a computer, the source code according to the second hierarchy level to created newly scaled source code, and generating, based on the received selection, a second CVB at the second hierarchy level including the newly scaled source code.

Other implementations of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes or causes the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features:

A first aspect, combinable with the general implementation, wherein the plurality of hierarchy levels is scaled discretely from a higher zoom level to a lower zoom level.

A second aspect, combinable with any of the previous aspects, wherein each hierarchy level includes a plurality of CVBs.

A third aspect, combinable with any of the previous aspects, wherein the plurality of hierarchy levels is scaled discretely from a higher zoom level to a lower zoom level.

A fourth aspect, combinable with any of the previous aspects, wherein source code associated with the higher zoom level is at a higher level of abstraction than source code associated with the lower zoom level.

A fifth aspect, combinable with any of the previous aspects, wherein source code associated with a particular CVB at a particular hierarchy level is defined by a mapping file.

A sixth aspect, combinable with any of the previous aspects, wherein the mapping file includes definitions of at least one object property, method name, method parameter, method return type, method modifier, method body, or external code.

A seventh aspect, combinable with any of the previous aspects, wherein the graphical controller includes at least one of a slider, a dial, a number selector, or an array of buttons.

The subject matter described in this specification can be implemented in particular implementations so as to realize one or more of the following advantages. Source code can include different hierarchy levels, and one or more code viewer boxes (CVB) at each hierarchy level, each hierarchy level associated with definition, implementation, and/or other specified aspects of the source code. Each CVB (e.g., a window or part of the user interface display) at each hierarchy level can be associated with a different source code focus, such as client code, server code, database code, and the like. While, conventional application code editors display hierarchy levels and consistent CVBs together, the resulting presentation can be complicated and the hierarchy level boundaries not clearly indicated. An application code editor can now display a user selected hierarchy level, or zoom level, of available zoom levels for one or more CVBs. A particular zoom level presents only a portion of source code associated with a CVB corresponding to a particular hierarchy level, simplifying the software development environment interface for users. As the zoom levels change, the application code editor can include or exclude source code depending on whether the source code should be displayed at the particular zoom level. The ability to zoom to different hierarchy levels enables users to more clearly analyze, edit, delete, and/or execute source code within a specific CVB associated with a selected hierarchy level and allows users interested in different views/aspects of the source code to focus on one or more hierarchy levels consistent with their interest. For example, a source code architect may wish to focus on a higher-level hierarchy level while a source code developer may wish to focus on a lower-level hierarchy level. Other advantages will be apparent to those skilled in the art.

While generally described as computer-implemented software embodied on tangible and non-transitory media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

This specification describes methods, systems, and computer-readable media for displaying different computer program source code hierarchy levels within an application code editor.

Figure 1:
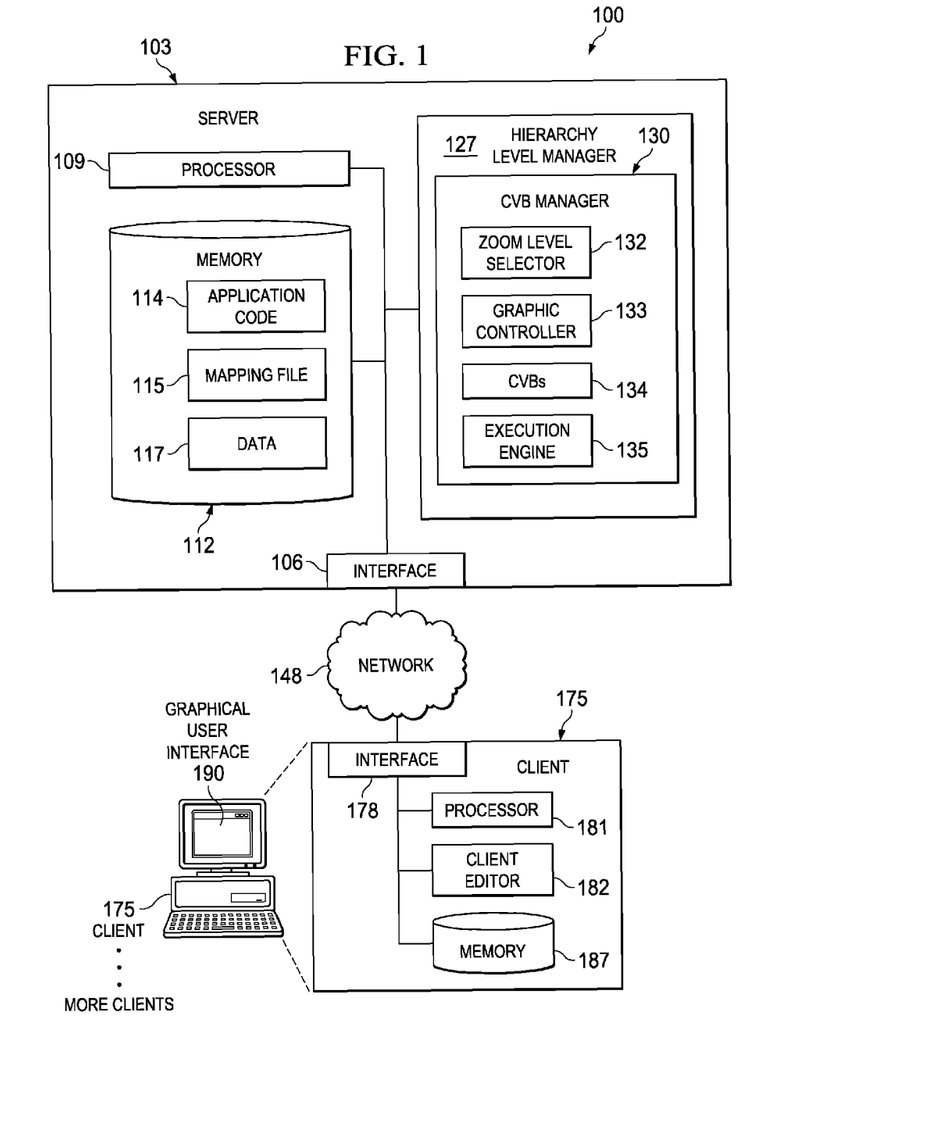
FIG. 1 illustrates an example environment for implementing various features of an application code editor for displaying different computer program code hierarchy levels.

FIG. 1 illustrates an example environment 100 for implementing various features of a system providing software development environment including an application code editor. The illustrated example environment 100 includes, or is communicably coupled with, a client 175, and a server 103. At least some communication between the server 103 and the client 175 may be performed using network 148. In general, the example environment 100 depicts an example configuration of a system for providing a hierarchy level manager 127 on the server 103 communicating with the client 175. The server 103 can also provide applications, processing functionality, and/or database resources to the client 175 (e.g., to support a client editor 182). In alternative implementations, the elements illustrated in FIG. 1 can be included in or associated with different and/or additional servers, clients, networks, and locations other than those illustrated. For example, there may be additional clients 175 communicably connected to the server 103. In another example, multiple clients 175 may be connected to one or more servers similar to the server 103 to permit availability of various functionalities and services consistent with this disclosure. In some implementations, one or more of the components illustrated within the server 103, the client 175, and/or any of the other illustrated components, can be located in multiple or different servers, cloud-based networks, or other locations accessible to the server 103, either directly or indirectly using the network 148.

At a high level, the example environment 100 is a programming environment providing a user with a client editor 182 on the client 175 and/or an application code editor 113 on the server 103 for editing application code 114. The application code 114 can be viewed and edited at different hierarchy levels; each hierarchy level can include one or more code viewer boxes (CVB). The hierarchy levels can be defined in the programming environment or by the user, from a high level such as general application description, object description, to a low level such as object properties, method parameters, among others. CVBs can be a particular view or interface, for example a tab or layered window allowing a user to interact with a different application code 114 at the corresponding hierarchy level. For example, a first application code 114 may correspond to a software module to send data, while a second application code 114 may correspond to a software module to receive data. In the client editor 182 and/or the application code editor 113, a user could view the first and the second application codes 114 at the same hierarchy level in two different CVBs. This would permit the user to compare and contrast the first and the second application codes 114. Part of a particular application code 114 can be edited and viewed within each individual CVB. When the client editor 182 or the application code editor 113 is launched, an initial CVB at a default hierarchy level is generated. A user can select a zoom level from a graphical controller associated with the client editor 182 or the application code editor 113. In some implementations, each particular zoom level corresponds to a different hierarchy level. Based on a user-selected zoom level, a new CVB may be generated at a different hierarchy level corresponding to the zoom level.

As illustrated in FIG. 1, the client 175 includes a processor 181, memory 187, and the client editor 182 for users to generate and edit application code 114. The client 175 can connect to the server 103 using the network 148 to gain, for example, additional processing resources and support. For example, the client editor 182 can use various functionalities and computational resources provided by the server 103. In some implementations, the client editor 182 can be an intermediate user interface for an application code editor 113 on the server 103. The client editor 182 and/or the application code editor 113 can allow users to program application code 114 comprising multiple hierarchy levels and/or program levels. The application code 114 can be organized and displayed based on the hierarchy levels and/or program levels by a hierarchy level manager 127. The hierarchy level manager 127 can also enable a user to select a particular hierarchy level. For example, the user can zoom in to a lower hierarchy level, or zoom out to a higher hierarchy level of the application code 114 using a zoom level selector. Through the use of different hierarchy levels and/or program levels, the hierarchy level manager 127 can present to the user a structured, clean, and efficient programming environment (further described below)..

In the illustrated implementation of FIG. 1, the server 103 includes an interface 106, a processor 109, a memory 112, the application code editor 113, and the hierarchy level manager 127. The interface 106 is used by the server 103 to communicate with other systems in a client-server or other distributed environment (including within example environment 100) connected to the network 148 (e.g., the client 175, as well as other systems communicably coupled to the network 148). The interface 106 generally includes logic encoded in software and/or hardware in a suitable combination and operable to communicate with the network 148. More specifically, the interface 106 may include software supporting one or more communication protocols associated with communications such that the network 148 or the interface hardware is operable to communicate physical signals within and outside of the illustrated example environment 100.

The processor 109 can be any appropriate processing unit or units to enable computation in the server 103. Although illustrated as a single processor 109, two or more processors may be used in the server 103 according to particular needs, desires, or particular embodiments of environment 100. Generally, the processor 109 executes instructions and manipulates data to perform the operations of the server 103 and, specifically, the functionality associated with the corresponding hierarchy level manager 127 and/or application code editor 113. The server's processor 109 also executes the functionality required to receive inbound communications from and send outbound communications to the client 175.

The memory 112 of the illustrated server 103 stores at least one or more application code 114, a mapping file 115, data 117, and other data and program instructions (not illustrated). In some implementations, including a cloud-based system, some or all of the memory 112 may be stored remote from the server 103 and/or communicably coupled to the server 103 for usage. Specifically, the memory 112 may store the mapping file 115 in support of the hierarchy level manager 127. The mapping file 115 defines hierarchy levels and data locations for source code associated with each CVB in the application code editor 113 and/or the client editor 182. Details of the mapping file 115 are further described in FIG. 3. The application code 114 can either pre-exist or be programmed by users. The data 117 can be generated and used in the application code editor 113. For example, the application code editor 113 can load existing data from data 117 or generate, based on user input, new data to be saved to the data 117. In some implementations, some or all of the elements illustrated within memory 112 may be stored externally to the memory 112.

At a high level, the hierarchy level manager 127 can be a framework for integrating information and processes across application code 114 boundaries and managing hierarchy levels of CVBs in the application code editor 113 and/or the client editor 182. For example, the hierarchy level manager 127 can provide users with a zoom level selector 132 for selecting a desired hierarchy level to view or edit an application code 114. In some implementations, the hierarchy level manager 127 may interact with multiple application code editors and provide hierarchy level selection. In particular, the hierarchy level manager 127 may operate in response to and in connection with one or more requests received from an associated client 175 or other remote client to enable a particular hierarchy level selection. Additionally, the hierarchy level manager 127 may operate in response to and/or in connection with one or more requests received from other applications external to the server 103. For example, the operation of the hierarchy level manager 127 to enable hierarchy selection may be initiated by a request requiring actions from a particular client 175 and a particular application, for example the client editor 182, associated with the particular client 175. In some implementations, the hierarchy level manager 127 may communicate with one or more of the client editors 182. In some implementations, the client editor 182 represents a web-based application, such as a browser, accessed and executed by remote clients 175 using the network 148 (e.g., through the Internet, or using one or more cloud-based services associated with the hierarchy level manager 127).

The hierarchy level manager 127 includes a CVB manager 130. In some instances, a hierarchy level includes one CVB 134; in other instances, a hierarchy level includes two or more CVBs 134. Different CVBs 134 may be controlled by the same or different CVB manager 130. Each CVB manager 130 includes at least a zoom level selector 132, a graphic controller 133, a number of CVBs 134, and an execution engine 135. The hierarchy level manager 127 enables users to generally select any desired hierarchy level associated with a particular application code 114. For example, an application code 114 can include multiple hierarchy levels, such as, a general application description file, an evolutionary rapid development (ERD) file, an object description file, an object user interface (UI) file, object properties and method names, among others.

The CVB manager 130 can manage a number of CVBs, each of which is associated with a particular hierarchy level. The zoom level selector 132 and the graphic controllers 133 can appear in the application code editor 113 and/or the client editor 182 as part of the graphical user interface (GUI) 190 selectable by the user. For example, the graphical controller 133 can generate and/or display a slider, a dial, a number selector, an array of buttons, or other suitable GUI graphical controllers. The zoom level selector 132 can comprise a value indicator with a graphical controller 133. For example, if the graphical controller 133 is a slider, the zoom level selector 132 can be a sliding pointer on the slider for selecting an indicated value. When the graphical controller 133 is a dial, the zoom level selector 132 can be a pointing/gauge arm. When the graphical controller 133 is a number selector, the zoom level selector 132 can be any interactive buttons for selecting a number in the graphical controller 133.

The hierarchy level selected on the zoom level selector 132 is processed in the CVB manager 130 to generate a corresponding CVB 134 for viewing and/or editing source code in the application code editor 113 and/or the client editor 182. The CVB 134 can further include information related to data location, data types, and other data properties. For example, the CVB 134 can identify data under specified directories. Each CVB 134 can enable a user to program application code 114 at the associated hierarchy level. For example, a higher-level hierarchy-level CVB may enable the user to edit a general application description and avoid lower-level details. The user can then select a lower-level hierarchy level by using the zoom level selector 132 on the graphical controller 133 to zoom in and display a lower-level hierarchy level CVB. The lower-level hierarchy level CVB can include further details including object properties, method names, method parameters, method return types, method modifiers, method body and/or external code, among others. The zooming action within the application editor 113 or the client editor 182 can allow users to discretely or continuously expand or collapse the application code 114 at different hierarchy levels; therefore enabling users to input, view and edit any specific targeted content at an appropriate level.

The server 103 is any computing device that stores, manages, and executes functionality associated with the application code editor 113 and/or the hierarchy level manager 127. Additionally, the server 103 may execute one or more application code editors 113 and/or hierarchy level managers 127. In some instances, each server 103 may store a plurality of various applications (not illustrated); while in other instances, the server 103 may be a dedicated server meant to store and execute the application code editor 113 and/or hierarchy level managers 127 for a particular platform or application and its related functionality. In some instances, the server 103 may include a web server or be communicably coupled with a web server, where one or more of the application code editors 113 and/or hierarchy level managers 127 associated with the server 103 represent web-based (or web-accessible) applications accessed and executed through requests and interactions received by the client 175, executing a client editor 182 operable to interact with programmed tasks, one or more application code editors 113, and/or hierarchy level managers 127.

The server 103 is operable to receive, transmit, process, store, or manage data and information associated with the environment 100. The server 103 illustrated in FIG. 1 can be responsible for receiving editor-related requests from one or more clients 175 (as well as any other entity or system interacting with the server 103, including desktop or mobile client systems), responding to the received requests by processing said requests in the associated application code editor 113 and/or hierarchy level manager 127, and sending the appropriate responses from the appropriate component back to the requesting client 175 or other requesting system. Components of the server 103 can also process and respond to local requests from a user locally accessing the server 103. Accordingly, in addition to requests from the client 175 illustrated in FIG. 1, requests associated with a particular component may also be sent from internal users, external or third-party customers, and other associated business applications, business processes, as well as other appropriate entities, individuals, systems, or computers. In some instances, the application code editor 113 and/or hierarchy level manager 127 or the client editor 182 may be a web-based application executing functionality associated with a networked or cloud-based business process.

Referring now to the client 175 illustrated in FIG. 1, the client 175 may be any computing device operable to connect to or communicate with the server 103 using the network 148, or another suitable communication means or channel. In some instances, the client 175 may be a part of or associated with a business process involving one or more of a remote developer or user associated with the server 103, for example, a user using the client editor 182 on client 175. It will be understood that there may be any number of clients 175 associated with, or external to, environment 100. For example, while illustrated environment 100 includes a single client 175, alternative implementations of example environment 100 may include multiple clients 175 communicably coupled to one or more of the systems illustrated. In some instances, one or more clients 175 may be associated with administrators of the environment, and may be capable of accessing and interacting with the settings and operations of one or more servers 103, and/or other components of the illustrated environment 100. Additionally, there may also be one or more additional clients 175 external to the illustrated portion of environment 100 capable of interacting with the example environment 100 using the network 148.

The illustrated client 175 includes an interface 178, a processor 181, the client editor 182, and a memory 187. The interface 178 is used by the client 175 for communicating with other systems in a distributed environment connected to the network 148; for example, the server 103 as well as other systems communicably coupled to the network 148 (not illustrated). The interface 178 may also be consistent with the above-described interface 106 of the server 103 or other interfaces within the example environment 100. The processor 181 may be consistent with the above-described processor 109 of the server 103 or other processors within the example environment 100. Specifically, the processor 181 executes instructions and manipulates data to perform the operations of the client 175, including the functionality required to send requests to the server 103 and to receive and process responses from the server 103. The memory 187 may be consistent with the above-described memory 112 of the server 103 or other memories within the example environment 100 but storing objects and/or data associated with the purposes of the client 175.

Further, the representative client 175 illustrates a GUI 190 applicable to the client 175 in general. The GUI 190 provides a visual interface with at least a portion of the example environment 100. Generally, through the GUI 190, server 103 users are provided with an efficient and user-friendly presentation of data provided by or communicated within the example environment 100. For example, the GUI 190 may be associated with the client editor 182 and used to view, navigate, and/or configure content of the server 103 and/or the client 175. In some implementations, the client editor 182 may be used to access various portions of the server 103. In some instances, the client editor 182 may be an agent or client-side version of a component of the server 103.

As used in this disclosure, each client 175 is intended to encompass a personal computer, touch screen terminal, workstation, network computer, kiosk, wireless data port, smart phone, personal data assistant (PDA), one or more processors within these or other devices, or any other suitable processing device. For example, each client 175 may include a computer that includes an input device, such as a keypad, touch screen, mouse, or other device that can accept user information, and an output device that conveys information associated with the operation of the client editor 182, and/or the client 175 itself, including digital data, visual information, or the GUI 190. Both the input and output device may include fixed or removable storage media such as a magnetic storage media, CD-ROM, or other suitable media, to both receive input from and provide output to users of client 175 through the display, namely, the GUI 190. As previously stated, the client's processor 181, interface 178, and memory 187 may be similar to or different from those described in connection with the other components illustrated in FIG. 1, although alternative implementations of one or more of these components may be used, as well as implementations where additional components may also be included.

FIG. 1 depicts a client-server environment, but could also represent a cloud-computing network. Various other implementations of the illustrated environment 100 can be provided to allow for increased flexibility in the underlying system, including multiple servers 103 performing or executing one or more additional or alternative instances of the application code editors 113 and/or hierarchy level managers 127 for one or more different platforms, as well as multiple instances of the application code editors 113 and/or hierarchy level managers 127 and their related functionality. In those instances, a different servers 103 may communicate with each other using a cloud-based network or through the connections provided by network 148. Generally, the server 103 may be communicably coupled with the network 148 that facilitates wireless or wireline communications between the components of the example environment 100 (i.e., between the server 103 and one or more clients 175), as well as with any other local or remote computer, such as additional clients, servers, or other devices communicably coupled to the network 148, including those not illustrated in FIG. 1.

In the illustrated environment, the network 148 is depicted as a single network, but may comprise more than one network without departing from the scope of this disclosure, so long as at least a portion of the network 148 may facilitate communications between all components of the example environment 100. In some instances, one or more of the components associated with the server 103 may be included within the network 148 as one or more cloud-based services or operations.

Figure 2:
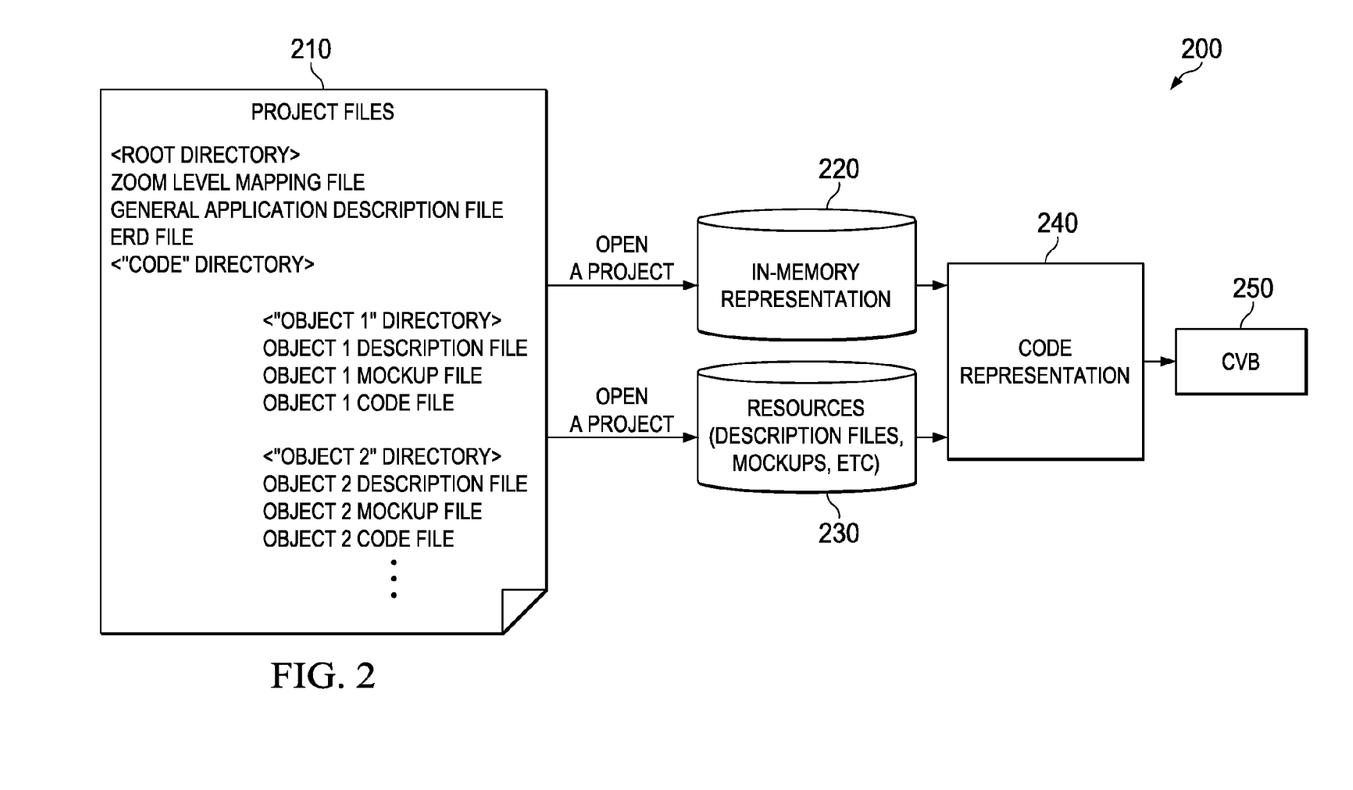
FIG. 2 illustrates an example operation flow diagram for zooming between hierarchy levels within an application code editor.

FIG. 2 illustrates an example operation flow diagram 200 for zooming between hierarchy levels within an application code editor. The operation flow diagram 200 may represent an example sequence of operations conducted by a user on an application code editor such as the application code editor 113 illustrated in FIG. 1. A user may create a number of project files 210 to introduce basic data location and structure of the computer program source code to be edited. For example, the project files 210 can include definitions of root directories identifying locations of a hierarchy-level mapping file, a general application-description file, an evolutionary rapid development (ERD) file, and other files. The project files 210 can further include definitions of directories of application code, such as directories of various objects. An example "object 1" can include directories for an object 1 description file, mockup file, and/or code file. Multiple object directories can be included. The project files 210 can be opened into in-memory representation 220 or any code element representation, for example a report definition language (RDL), and/or other resources 230 such as description files, mockup files, among others.

The code representation 240, based on the in-memory representation 220 or other resources 230, can be viewed as code or other resources based on a default or user-selected zoom level. For example, a default zoom level could be a high-level hierarchy level showing high-level CVB 250, representing the code representation 240. In some implementations, the high-level CVB 250 can identify application functions, object types, user roles, and other high-level modules, without showing detailed application code such as object properties, method names, method parameters, method return types, method modifiers, among others. In some implementations, a user can define a particular zoom level to represent the code representation 240. The particular zoom level can be selected from the hierarchy level mapping file defined in the project files 210 using input received from the zoom level selector. The user can then view and edit the code representation 240 in the displayed CVB 250 generated as a result of the zoom level selection. Detailed examples of the various CVBs 250 displayed at different zoom levels are illustrated in FIGS. 4A to 4F.

Figure 3:
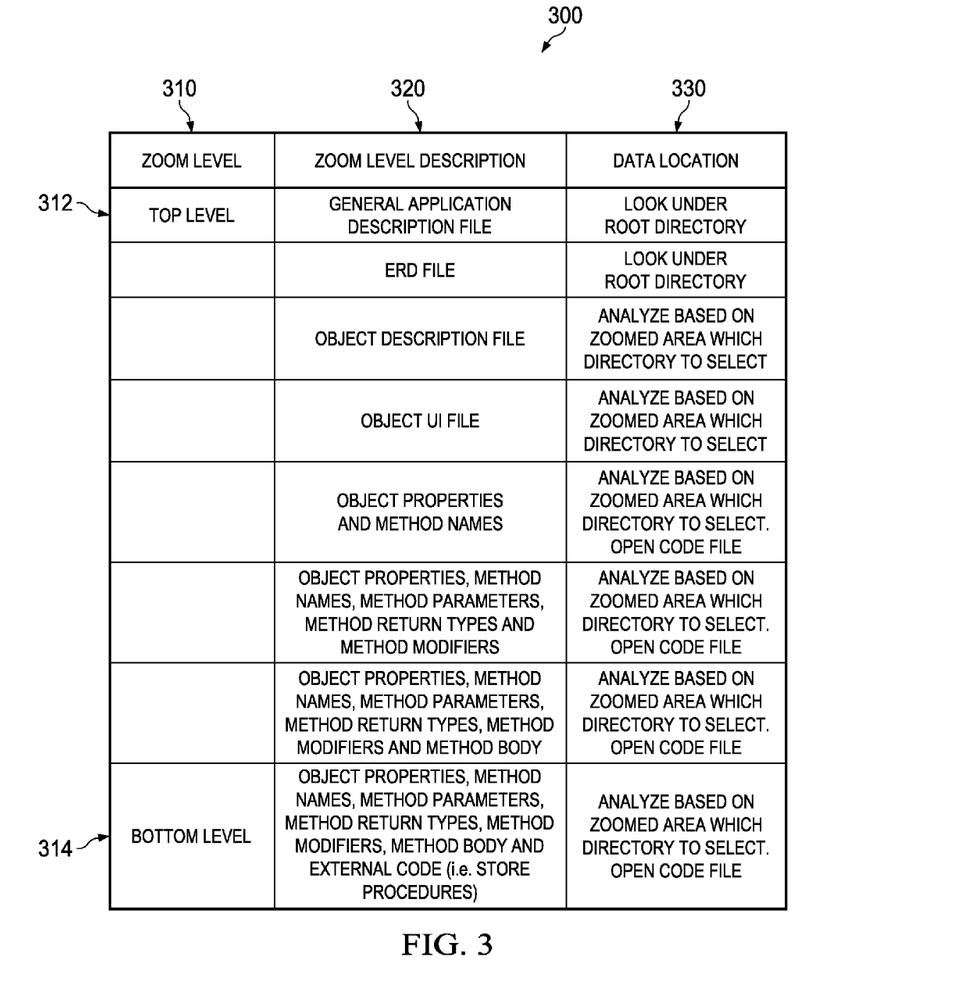
FIG. 3 illustrates an example mapping file applicable to an application code editor with zoom abilities.

FIG. 3 illustrates an example mapping file 300 applicable to an application code editor with zoom abilities. The mapping file 300 maps a specific hierarchy level as a zoom level 310, a high-level description of the zoom level 320, and a data location for source code to display for a selected zoom level 330. The mapping file 300 may also include further program language or code for execution or other functioning purposes. At a top level zoom level 312, the zoom level includes a general application description file located under a root directory. The bottom level zoom level 314 specifies additional detail code descriptions and data locations to locate them. For example, zoom levels lower than the top zoom level 312 includes an ERD file, one or more object description files, UI files, as well as others and the data location of these files is determined based on the selected zoom level. The bottom zoom level 314 includes the most detailed description, including object properties, method names, method parameters, method return types, method modifiers, method body and external code, and other low level properties.

Figure 4A:
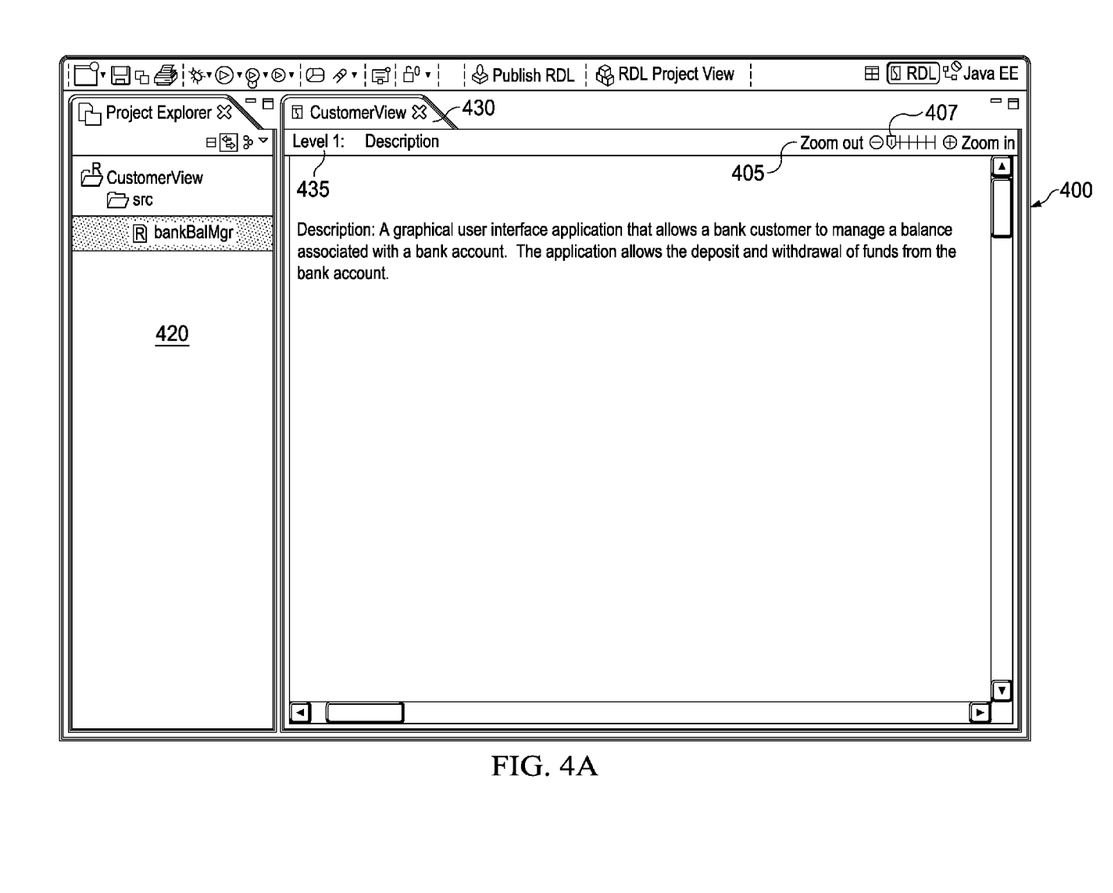
FIGS. 4A to 4F illustrate different computer program source code hierarchy levels in an application code editor.

FIGS. 4A to 4F illustrate different hierarchy levels and example views for an graphical user interface application that allows a bank customer to manage a balance associated with a bank account. In some implementations, FIGS. 4A to 4F correspond to the hierarchy level mapping file 300 as illustrated in FIG. 3. Other variations of the mapping file 300 are possible and are within the scope of this disclosure. Turning to FIG. 4A, a user interface 400 of an example application code editor is shown. The user interface 400 includes a project explorer 420 and one or more viewing windows 430. Each viewing window 430 includes at least a CVB 435 for viewing and editing application codes, a graphical controller 405 and a zoom level selector 407 for zooming among hierarchy levels. In FIGS. 4B to 4F, the application code editor uses the same user interface 400 for the different levels of hierarchy level zooming. The project explorer 420 can also include a file tree that includes one or more folders of application code files. In the illustrated example, one folder "src" is expanded with a single application code file available. The application code file "bankBalMgr" is selected in the project explorer 420 and a hierarchy level one description of the application code file is displayed in the CVB is shown in the viewing window 430. As will be appreciated by those skilled in the art, more or less folders and/or application code files can be included in the project explorer 420. Multiple viewing windows 430 can also be opened simultaneously and managed by the project explorer 420.

In FIG. 4A, the viewing window 430 shows a CVB 435 at a highest hierarchy level zoom level, here 1. The graphical controller 405 is set at the highest zoom level and is illustrated as a horizontal selection bar including eight discrete stops for moving the zoom level selector 407 to select a hierarchy level. In this example, hierarchy levels are selected from highest to lowest by moving the zoom level selector from left to right. Users can drag the zoom level selector 407 to one of the eight discrete stops in the graphical controller 405 to select a desired zoom level. Although the graphical controller 405 is illustrated as a horizontal selection bar, it should be understood that other implementations of the graphical controller 405 are possible. For example, the graphical controller 405 may be a dial, a number selector, an array of buttons, or other forms of graphical controllers.

Figure 4B:
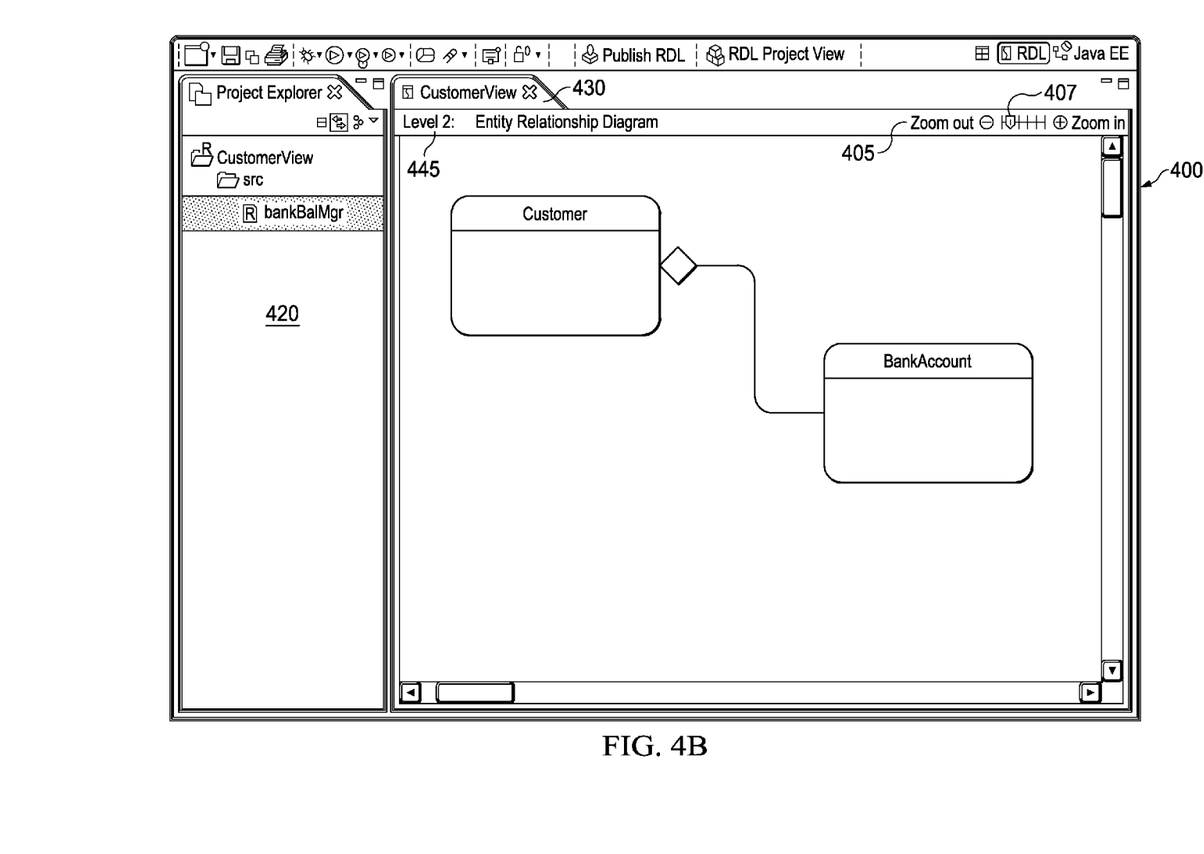

Turning to FIG. 4B, the CVB 445 is shown to include an entity relationship diagram between a Customer data object and a BankAccount data object for the bankBalMgr application source code. The diagram illustrates a model relationship between the data objects. In some implementations, more or less detail may be displayed for each data object. For example, the data objects may display a simple indication that there are associated properties and methods for each data object that may be viewed at a lower hierarchy level.

Figure 4C:
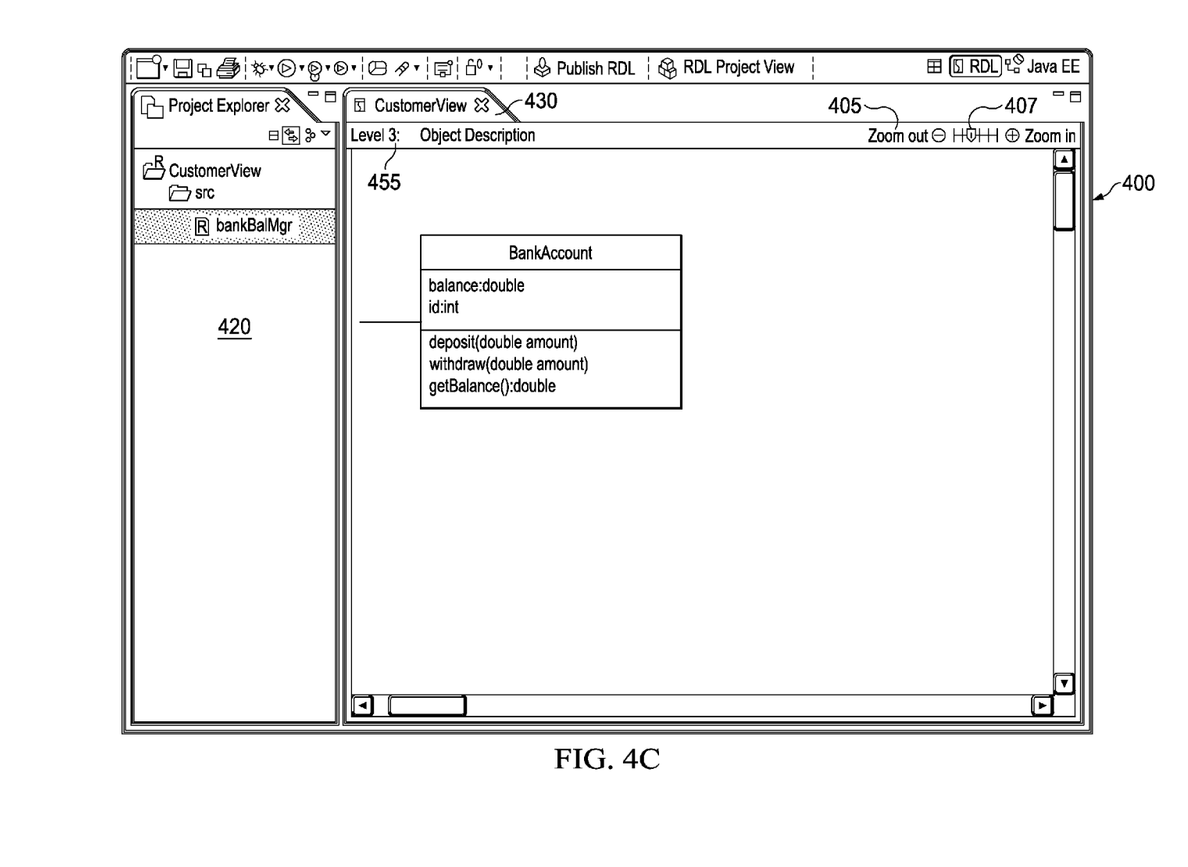

A next lower hierarchy level CVB 455 is illustrated in FIG. 4C. CVB 455 includes a zoomed view of the BankAccount object. The illustrated BankAccount data object is shown with two properties, "balance" and "id," and methods "deposit," "withdraw," and "getBalance."

Figure 4D:
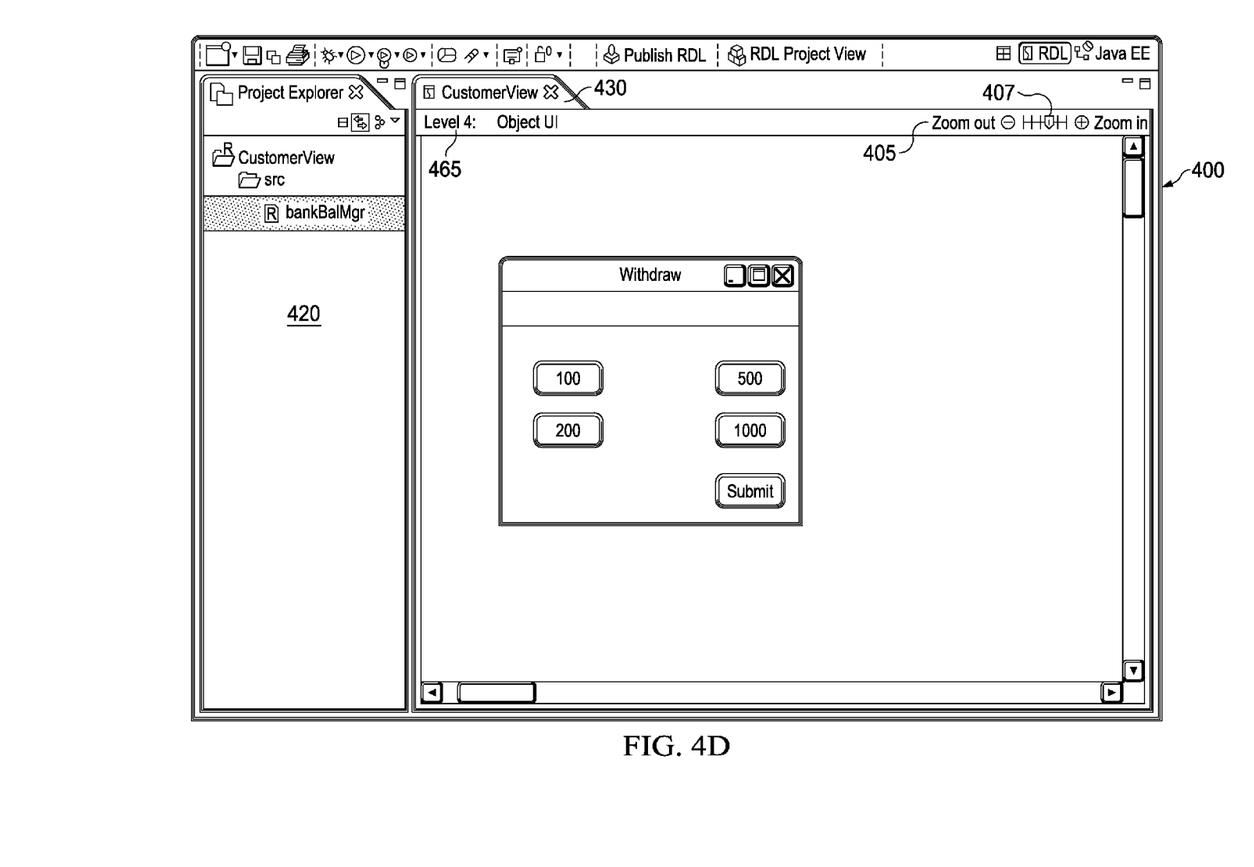

FIG. 4D shows yet another lower-level hierarchy level CVB 465. The CVB 465 illustrates a view of the user interface associated with the "withdraw" method. In this example, the user could have selected the method on FIG. 4C and then moved the zoom level selector 407 to the next lower hierarchy level.

Figure 4E:
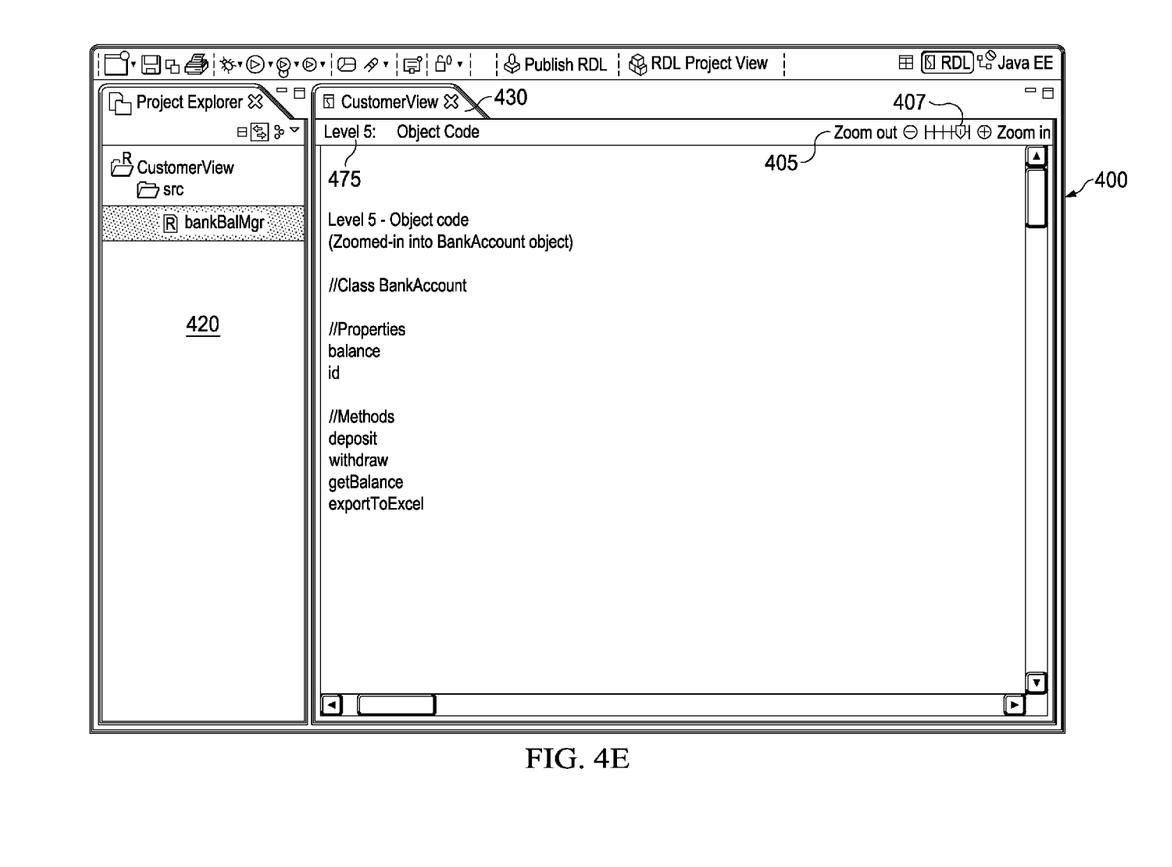
Figure 4F:
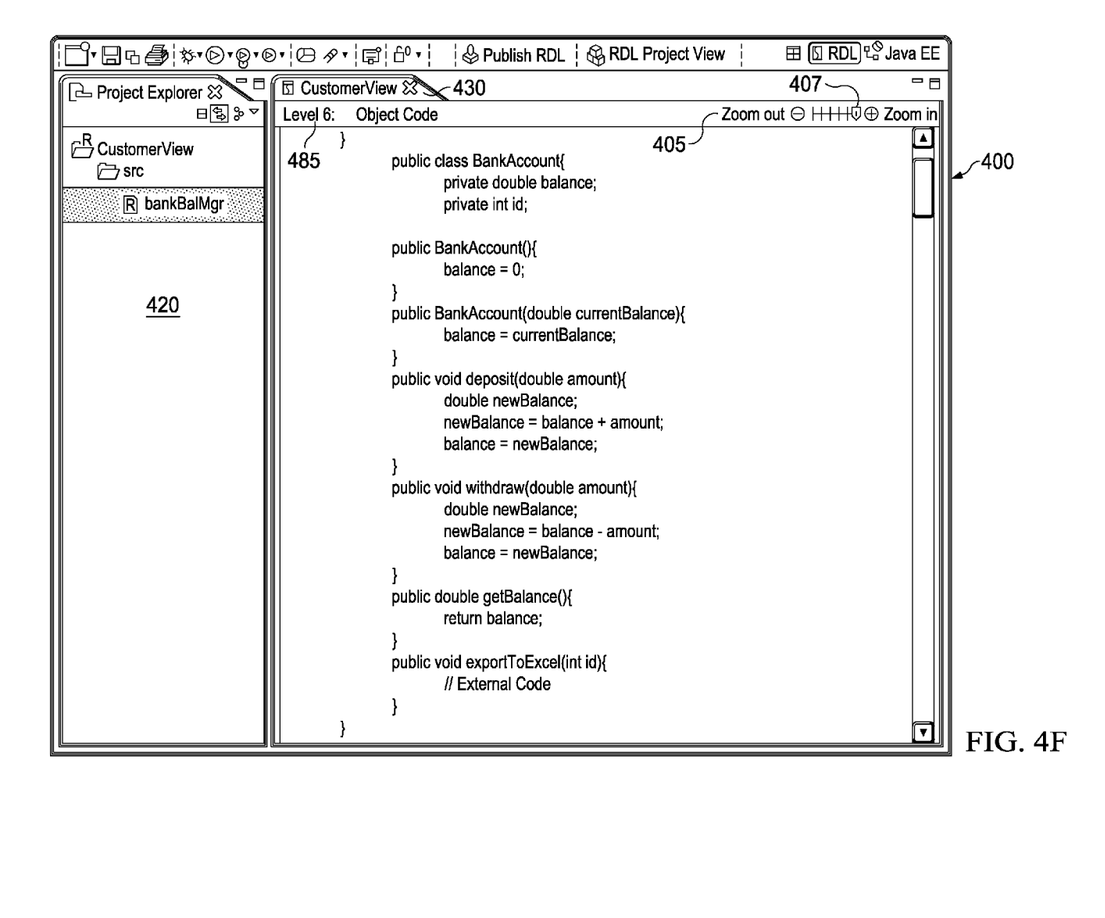

A next lower-level hierarchy level CVB 475 is illustrated in FIG. 4E. The CVB 475 includes object code for the BankAccount data object. Shown in high-level source code are names of properties and methods associated with the data object (as seen in FIG. 4C). Yet further, lower-level source code can be viewed and/or edited in a lower hierarchy level as shown in the CVB 485 of FIG. 4F. Here, additional details concerning the properties and methods are displayed. Also illustrated are additional available methods, for example "public BankAccount( )" and "public void exportToExcel(int id)."

Figure 5:
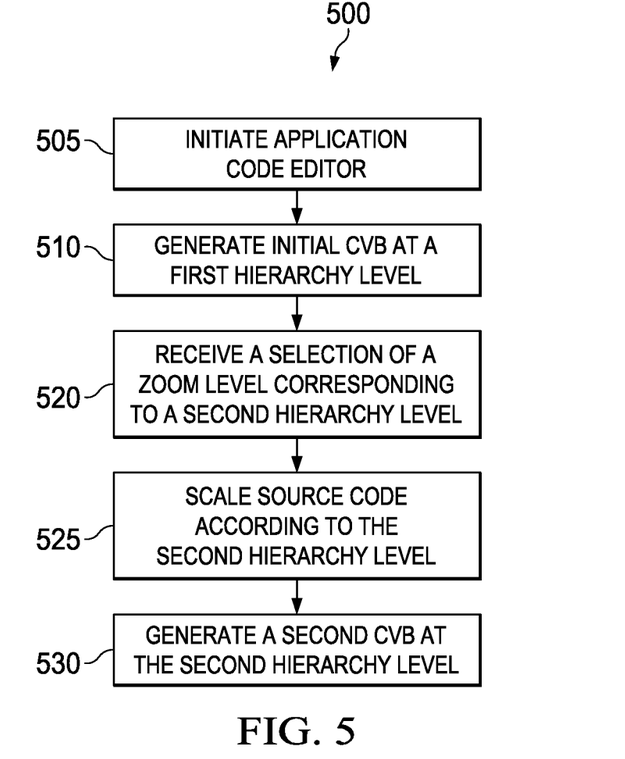
FIG. 5 illustrates an example method for zooming between hierarchy levels within an application code editor.

FIG. 5 illustrates an example method 500 for zooming within an application code editor. The example method 500 can be applied to the environment 100 illustrated in FIG. 1. At 505, a generic application code editor is initiated. The generic application code editor can be any appropriate text editor program designed for editing source code of computer programs by programmers. The application code editor may be a standalone application or may be built into an integrated development environment (IDE).

At 510, a CVB associated with a first hierarchy level is generated in a GUI. The first hierarchy level can be determined by a default value or through a user-defined hierarchy level. For example, the first hierarchy level could be the highest level, the lowest level, or some level in-between. In some implementations, users may select a particular hierarchy level to be the first hierarchy level. Various hierarchy levels may be defined in a hierarchy level mapping file, such as the hierarchy level mapping file 300, shown in FIG. 3. Source code is included in the CVB associated with the first hierarchy level. The included source code is scaled according to the first hierarchy level. From 510, method 500 proceeds to 520.

At 520, a selection of a zoom level is received, using a graphical controller comprising a zoom level selector. The zoom level corresponds to a second hierarchy level different from the generated first hierarchy level. The hierarchy levels can be scaled discretely from a higher zoom level to a lower zoom level. Data associated with the higher zoom level is at a higher level of abstraction than data associated with the lower zoom level. Each CVB belongs to a corresponding hierarchy level; while each hierarchy level may include one or more CVBs. The graphical controller may include a slider, a dial, a number selector, an array of buttons, or any appropriate graphical controller acting as a zoom level selector. From 520, method 500 proceeds to 525.

At 525, the source code is scaled according to the second hierarchy level. From 525, method 500 proceeds to 530.

At 530, a second CVB is generated at the second hierarchy level,. The second CVB includes the scaled source code corresponding to the second hierarchy level. From 530, method 500 stops.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., a central processing unit (CPU), a FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are illustrated as individual modules that implement the various features and functionality through various objects, methods, or other processes, the programs may instead include a number of sub-modules, third party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, a FPGA, or an ASIC.

Computers suitable for the execution of a computer program, by way of example, can be based on general or special purpose microprocessors or both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically-erasable programmable read-only memory (EEPROM), and flash memory devices; magnetic disks, e.g., internal hard disks or removable disks; magneto-optical disks; and CD-ROM, DVD+/–R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), or plasma monitor, for displaying information to the user and a keyboard and a pointing device, e.g., a mouse, trackball, or track pad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. A computer-implemented method comprising:
   generating, at a first hierarchy level of a plurality of hierarchy levels, a first code viewer box (CVB) in a software development environment, wherein source code associated with a particular CVB is defined by a mapping file for a particular hierarchy level and the first CVB includes source code scaled as defined by the mapping file for the first hierarchy level, wherein the mapping file provides a mapping of a specific hierarchy level as a zoom level, a high-level description of the zoom level, and a data location for source code to display for the zoom level as scaled source code associated with the particular hierarchy level;
   receiving a selection of the zoom level from a graphical controller, wherein the selected zoom level corresponds to a second hierarchy level;
   scaling, by operation of a computer and as defined by the mapping file, the source code for the second hierarchy level to create newly scaled source code; and
   generating, based on the received selection, a second CVB at the second hierarchy level including the newly scaled source code.

2. The computer-implemented method of claim 1, wherein the plurality of hierarchy levels is scaled discretely from a higher zoom level to a lower zoom level.

3. The computer-implemented method of claim 2, wherein source code associated with the higher zoom level is at a higher level of abstraction than source code associated with the lower zoom level.

4. The computer-implemented method of claim 1, wherein each hierarchy level includes a plurality of CVBs.

5. The computer-implemented method of claim 1, wherein the mapping file includes definitions of at least one object property, method name, method parameter, method return type, method modifier, method body, or external code.

6. The computer-implemented method of claim 1, wherein the graphical controller includes at least one of a slider, a dial, a number selector, or an array of buttons.

7. A non-transitory, computer-readable medium storing computer instructions executable by a data processing apparatus to perform operations comprising:
- generating, at a first hierarchy level of a plurality of hierarchy levels, a first code viewer box (CVB) in a software development environment, wherein source code associated with a particular CVB is defined by a mapping file for a particular hierarchy level and the first CVB includes source code scaled as defined by the mapping file for the first hierarchy level, wherein the mapping file provides a mapping of a specific hierarchy level as a zoom level, a high-level description of the zoom level, and a data location for source code to display for the zoom level as scaled source code associated with the particular hierarchy level;
- receiving a selection of the zoom level from a graphical controller, wherein the selected zoom level corresponds to a second hierarchy level;
- scaling the source code as defined by the mapping file for the second hierarchy level to create newly scaled source code; and
- generating, based on the received selection, a second CVB at the second hierarchy level including the newly scaled source code.

8. The non-transitory computer-readable medium of claim 7, wherein the plurality of hierarchy levels is scaled discretely from a higher zoom level to a lower zoom level.

9. The non-transitory computer-readable medium of claim 8, wherein source code associated with the higher zoom level is at a higher level of abstraction than source code associated with the lower zoom level.

10. The non-transitory computer-readable medium of claim 7, wherein each hierarchy level includes a plurality of CVBs.

11. The non-transitory computer-readable medium of claim 7, wherein the mapping file includes definitions of at least one object property, method name, method parameter, method return type, method modifier, method body, or external code.

12. The non-transitory computer-readable medium of claim 7, wherein the graphical controller includes at least one of a slider, a dial, a number selector, or an array of buttons.

13. A system, comprising:
a hardware processor configured to perform operations including:
- generating, at a first hierarchy level of a plurality of hierarchy levels, a first code viewer box (CVB) in a software development environment, wherein source code associated with a particular CVB is defined by a mapping file for a particular hierarchy level and the first CVB includes source code scaled as defined by the mapping file for the first hierarchy level, wherein the mapping file provides a mapping of a specific hierarchy level as a zoom level, a high-level description of the zoom level, and a data location for source code to display for the zoom level as scaled source code associated with the particular hierarchy level;
- receiving a selection of the zoom level from a graphical controller, wherein the selected zoom level corresponds to a second hierarchy level;
- scaling the source code as defined by the mapping file for the second hierarchy level to create newly scaled source code; and
- generating, based on the received selection, a second CVB at the second hierarchy level including the newly scaled source code.

14. The system of claim 13, wherein the plurality of hierarchy levels is scaled discretely from a higher zoom level to a lower zoom level.

15. The system of claim 14, wherein source code associated with the higher zoom level is at a higher level of abstraction than source code associated with the lower zoom level.

16. The system of claim 13, wherein each hierarchy level includes a plurality of CVBs.

17. The system of claim 13, wherein the mapping file includes definitions of at least one object property, method name, method parameter, method return type, method modifier, method body, or external code.

18. The system of claim 13, wherein the graphical controller includes at least one of a slider, a dial, a number selector, or an array of buttons.

* * * * *